United States Patent
Kelkar et al.

(10) Patent No.: US 7,555,673 B1
(45) Date of Patent: *Jun. 30, 2009

(54) CLUSTER FAILOVER FOR STORAGE MANAGEMENT SERVICES

(75) Inventors: Rasesh A. Kelkar, Pune (IN); Swanand S. Vaidya, Pune (IN); Rupali K. Tathavdekar, Cupertino, CA (US); Aditya V. Deshpande, Pune (IN)

(73) Assignee: Symantec Operating Corporation, Cupertino, CA (US)

( * ) Notice: Subject to any disclaimer, the term of this patent is extended or adjusted under 35 U.S.C. 154(b) by 166 days.

This patent is subject to a terminal disclaimer.

(21) Appl. No.: 11/443,629

(22) Filed: May 31, 2006

Related U.S. Application Data (63) Continuation of application No. 10/273,213, filed on Oct. 17, 2002, now Pat. No. 7,058,846.

(51) Int. Cl.
*G06F 11/00* (2006.01)

(52) U.S. Cl. .......................................... 714/11

(58) Field of Classification Search ........................ None
See application file for complete search history.

(56) References Cited

U.S. PATENT DOCUMENTS

| | | | | |
|---|---|---|---|---|
| 6,088,727 A * | 7/2000 | Hosokawa et al. | ........ | 709/223 |
| 6,134,673 A * | 10/2000 | Chrabaszcz | ........ | 714/13 |
| 6,421,787 B1 * | 7/2002 | Slaughter et al. | ........ | 714/4 |
| 6,675,217 B1 * | 1/2004 | Dani et al. | ........ | 709/229 |
| 6,732,166 B1 * | 5/2004 | Woodruff | ........ | 709/221 |
| 6,862,613 B1 * | 3/2005 | Kumar et al. | ........ | 709/220 |
| 2003/0224781 A1 * | 12/2003 | Milford et al. | ........ | 455/426.1 |

* cited by examiner

*Primary Examiner*—Michael C Maskulinski
(74) *Attorney, Agent, or Firm*—Campbell Stephenson LLP (57) ABSTRACT

A method, system, and computer program product to enable other nodes in a cluster to resume operations of a failed node. These operations include storage management services that allow configuration changes to be made dynamically to storage resources. Resource configuration data are synchronized on a set of nodes in a cluster immediately when a resource configuration change is made. If a node that has made a resource configuration change fails, the resource configuration change is available for use by other nodes in the set, each of which can resume operations of the failed node.

15 Claims, 8 Drawing Sheets

CLUSTER FAILOVER FOR STORAGE MANAGEMENT SERVICES

CROSS-REFERENCE TO RELATED APPLICATIONS

This application is a continuation of U.S. patent application Ser. No. 10/273,213, entitled "Cluster Failover for Storage Management Services," filed Oct. 17, 2002 now U.S. Pat. No. 7,058,846, and naming Rasesh A. Kelkar, Swanand A. Vaidya, Rupali K. Tathavdekar, and Aditya V. Deshpande as inventors.

Portions of this patent application contain materials that are subject to copyright protection. The copyright owner has no objection to the facsimile reproduction by anyone of the patent document, or the patent disclosure, as it appears in the Patent and Trademark Office file or records, but otherwise reserves all copyright rights whatsoever.

BACKGROUND OF THE INVENTION

Information drives business. A hardware or software failure affecting a data center can cause days or even weeks of unplanned downtime and data loss that could threaten an organization's productivity. For businesses that increasingly depend on data and information for their day-to-day operations, this unplanned downtime can also hurt their reputations and bottom lines. Businesses are becoming increasingly aware of these costs and are taking measures to plan for and recover from hardware and software failure and disasters affecting entire data centers.

One strategy to recover from failure of hardware and/or software is clustering, wherein computer systems and storage devices are interconnected, typically at high speeds, within a local data center. Clustering is used for various purposes, including improving reliability, availability, serviceability, and/or performance via load balancing. Redundant interconnections between the computer systems are typically included, and the collection of computer systems, storage devices, and redundant interconnections is referred to herein as a cluster. The cluster appears to users as a single, highly available system. Different types of clusters may be established to perform independent tasks, to manage diverse hardware architectures performing similar tasks, or when local and backup computer systems are far apart physically.

Often, computer systems within a cluster use a common pool of storage devices, and the purpose of the cluster is to provide an alternative processing resource for the data on the shared storage devices in the event of failure of one of the computer systems. In some clustering environments, only one of the computer systems in the cluster provides processing resources with respect to a particular software application. The computer system currently providing processing resources in the cluster for a particular software application is referred to herein as the primary node, and other computer systems in the cluster are referred to herein as backup, or secondary, nodes.

Each clustered computer system typically runs special software to coordinate the activities of the computer systems in the cluster. This software is referred to herein as a cluster manager. A cluster manager may monitor the "health" of sites in a distributed system and restart an application on another node when the node running the application fails. Typically, cluster management functions are limited to such clustering operations as monitoring, starting, and stopping resources. Communication between nodes in a cluster is typically limited to messages to check the "heartbeat" of other nodes in the cluster and to ensure proper operation of the cluster.

Clustering and storage technologies have grown substantially in recent years, and changes in one technology sometimes require changes in the other for interoperability. Most storage devices in use today are not specially adapted to operate in a clustering environment, and configuration data about the storage devices are typically maintained by host computer systems acting as servers for the storage devices. In some environments, configuration data about storage resources are maintained in files or databases on the host computer system. If a server for a given storage resource fails, configuration data about the storage resource can be inaccessible to other nodes in the cluster. A new node resuming operations of the failed node would be unaware of the configuration change and may be unable to communicate properly with the reconfigured storage resource.

What is needed is a system that enables other nodes in a cluster to resume operations of a failed node. These operations should include storage management services that allow configuration changes to be made dynamically to storage resources. Storage configuration information should be made available to some or all nodes in a cluster in as close to real-time as possible after making a storage configuration change. The solution should impose minimal or no overhead on operation of the nodes. If a node that has made a resource configuration change fails, the resource configuration change should be made available to another node resuming operations of the failed node.

SUMMARY OF THE INVENTION

The present invention provides a method, system, and computer program product to enable other nodes in a cluster to resume operations of a failed node. These operations include storage management services that allow configuration changes to be made dynamically to storage resources. Resource configuration data are synchronized on a set of nodes in a cluster immediately when a resource configuration change is made. If a node that has made a resource configuration change fails, the resource configuration change is available for use by other nodes in the set, each of which can resume operations of the failed node.

BRIEF DESCRIPTION OF THE DRAWINGS

The present invention may be better understood, and its numerous objects, features and advantages made apparent to those skilled in the art by referencing the accompanying drawings.

The use of the same reference symbols in different drawings indicates similar or identical items.

DETAILED DESCRIPTION

For a thorough understanding of the subject invention, refer to the following Detailed Description, including the appended Claims, in connection with the above-described Drawings. Although the present invention is described in connection with several embodiments, the invention is not intended to be limited to the specific forms set forth herein. On the contrary, it is intended to cover such alternatives, modifications, and equivalents as can be reasonably included within the scope of the invention as defined by the appended Claims.

In the following description, for purposes of explanation, numerous specific details are set forth in order to provide a thorough understanding of the invention. It will be apparent, however, to one skilled in the art that the invention can be practiced without these specific details.

References in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Introduction

The present invention provides a method, system, and computer program product to make resource configuration information available to nodes in a cluster in as close to real-time as possible with minimal overhead. Resource configuration data are synchronized at nodes in the cluster, thereby enabling a node having synchronized configuration data to resume operations of a failed node. These operations include storage management services that allow configuration changes to be made dynamically to storage resources. Examples of resource configuration changes include adding a new disk to a storage array, creating a snapshot of a storage area to back up data at given point in time, and so on.

In some configurations, all nodes in a cluster may not be included in synchronization of resource configuration data. For example, a set of nodes may be designated as failover nodes, and other nodes can be set aside to perform other functions. All of the failover nodes synchronize resource configuration data. Each of the failover nodes therefore is capable of resuming operations of any other failover node. Preferably, the set of failover nodes includes most of the nodes in the cluster. The set of failover nodes includes at least two nodes.

Resource configuration information is made available to nodes in a cluster immediately when a resource configuration change is made by synchronizing resource configuration data on a set of nodes of the cluster. If a node that has made a resource configuration change fails, another node having synchronized resource configuration data can resume operations of the failed node because the resource configuration change has already been provided to that node.

In the environment of the present invention, storage resources are defined to include one or more physical storage devices, and operations are performed on storage resources. The present invention is discussed with regard to storage configuration information, although one of skill in the art will recognize that the present invention applies to other types of information that may be needed to recover from failure of hardware or software. Furthermore, although the present invention is discussed in terms of storage resources, information about any type of shared and managed resource, such as a printer, can be communicated using the systems and methods described herein.

Figure 1:
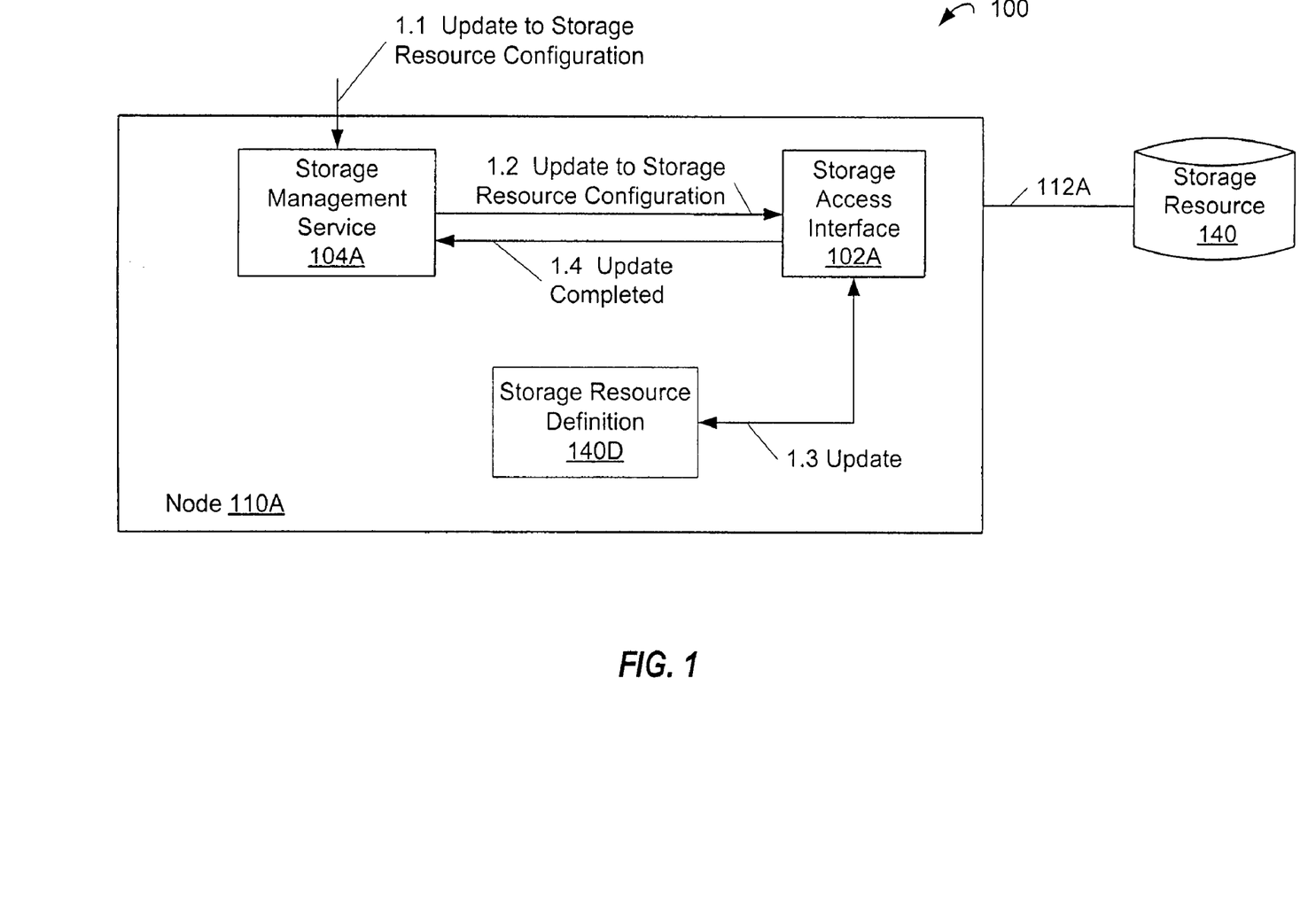
FIG. 1 is a diagram of a typical system for storage resource configuration.

FIG. 1 is a diagram of a typical system 100 for storage resource configuration. Storage resource configuration is used as a specific example of resource configuration, and one of skill in the art will recognize that similar systems can be used for configuring other types of resources. Node 110A is connected via interconnection 112A to storage resource 140. Node 110A includes a storage access interface 102A, storage management service 104A, and storage resource definition 140D, all of which are used in managing storage resource 140.

Storage access interface 102A represents a vendor-supplied interface for managing a particular storage resource. Storage access interface 102A is typically installed on a host computer system coupled to the storage resource, in this case, node 110A. Storage access interface 102A may be, for example, a dynamically linked library including functions that can be called to perform storage operations. Storage access interface 102A may include an application programming interface, a command line interface and/or a graphical user interface for managing storage resource 140.

Storage management service 104A is a service for managing storage resources, such as storage resource 140, in a multi-vendor storage environment. In the example shown, storage management service 104A communicates with storage access interface 102A when a storage resource configuration is to be changed. Storage resource definition 140D defines attributes of storage resource 140 and is used by storage access interface 102A to perform storage operations.

In action 1.1, an update to a storage resource configuration is provided to storage management service 104A. Typically, an update to a resource configuration is made by an administrator using a command line interface (not shown), but other ways of making resource configuration changes are also within the scope of the invention. In action 1.2, the update to the storage resource configuration is provided to storage access interface 102A, which updates storage resource definition 140D for storage resource 140 in action 1.3. In action 1.4, storage access interface 102A notifies storage management service 104A that the configuration update is complete.

One problem with system 100 described above is that storage resource definition 140D is stored on node 110A. If node 110A fails, storage resource 140 cannot be used because storage resource definition 140D is not accessible to other nodes. To make resource configuration available to another node that can resume operation of node 110A upon failure, the invention synchronizes resource configuration data on multiple nodes in a clustering environment.

Figure 2:
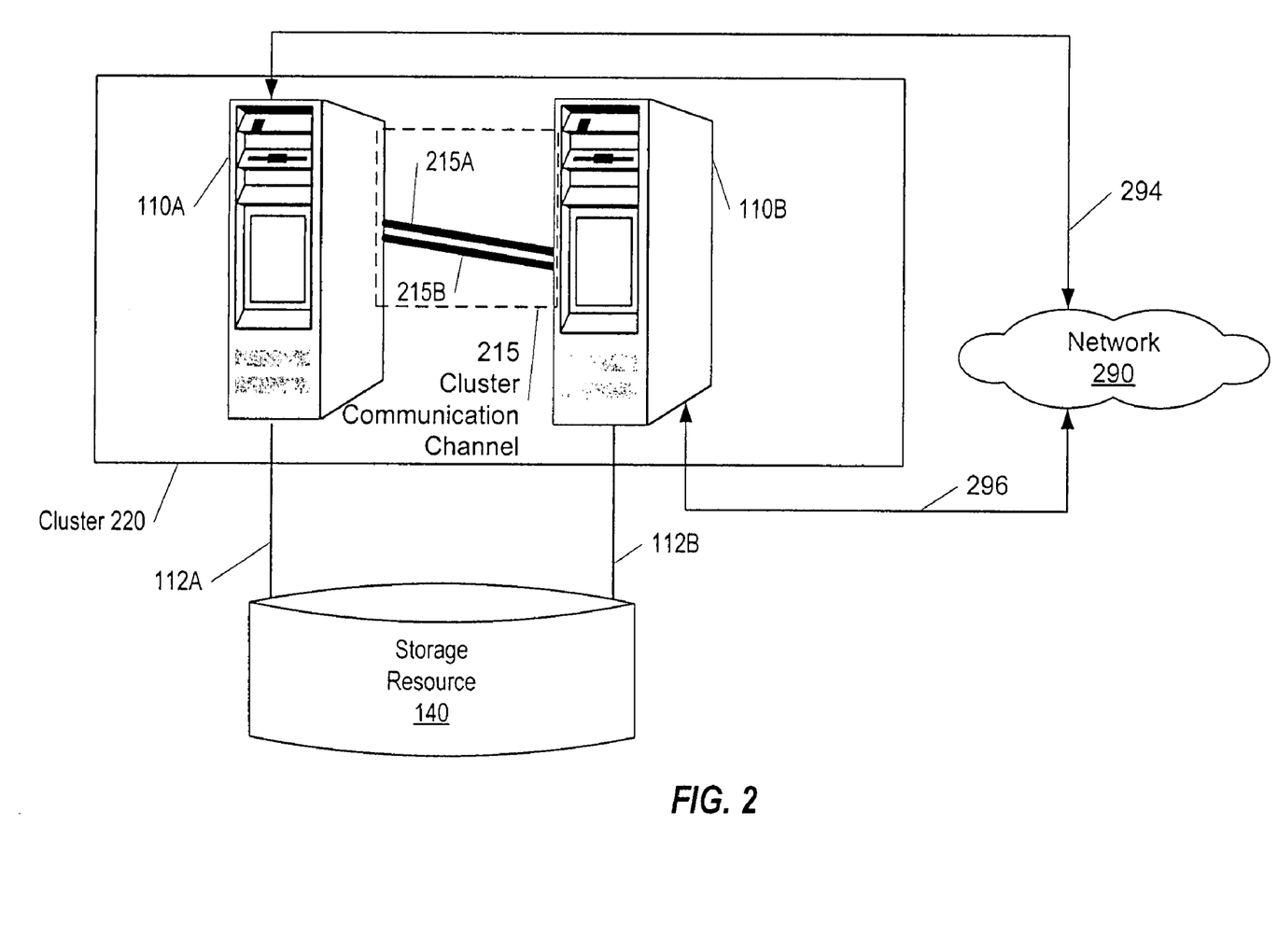
FIG. 2 is a block diagram of a cluster including a common storage resource.

FIG. 2 is a block diagram of a cluster. Cluster 220 includes nodes 110A and 110B. A cluster may include more than two nodes, and the present invention is not limited to a maximum number of nodes in a cluster.

Nodes 110A and 110B are connected via cluster communication channel 215, which includes redundant cluster connections 215A and 215B. Node 110A shares common storage resource 140 with node 110B. Node 110A is interconnected with storage resource 140 via interconnection 112A, and node 110B is interconnected with storage resource 140 via interconnection 112B.

Storage resource 140 is shown as a local storage resource, although storage for a particular cluster may be accessed via a network (not shown). For example, storage resource 140 may comprise a storage resource managed by a storage server (not shown) on a storage area network (not shown). Storage resource 140 may include intelligent and/or non-intelligent storage arrays.

In an example embodiment, nodes 110A and 110B are configured as servers for the same application program. Nodes in a cluster can be connected to shared storage, such as fibre channel or Small Computer System Interface (SCSI) RAID arrays, via a separate fibre switch using redundant fibre channel connections or directly using SCSI/fibre cables. Cluster communication channel 215 connects nodes 110A and 110B of cluster 220. Redundant interconnections 215A and 215B are shown as redundant heartbeat private network connections via crossover cables between redundant network interface cards (NICs) when two nodes form the cluster. When more than two nodes form the cluster, the private network connection can use a hub. Alternatively, cluster communication channel 215 may be implemented as a common storage area shared by nodes of cluster 220. Heartbeat data can be written to the common storage area and read whenever the status of nodes in the cluster is checked.

The private network provided via cluster communication channel 215 enables failover software (not shown) to recognize when a system or process has failed. Redundant power sources (not shown) are also included in the event of a power failure. In most environments, clusters also have redundant public network connections, such as connections 294 and 296 to network 290, to communicate via a public network such as the Internet.

Figure 3:
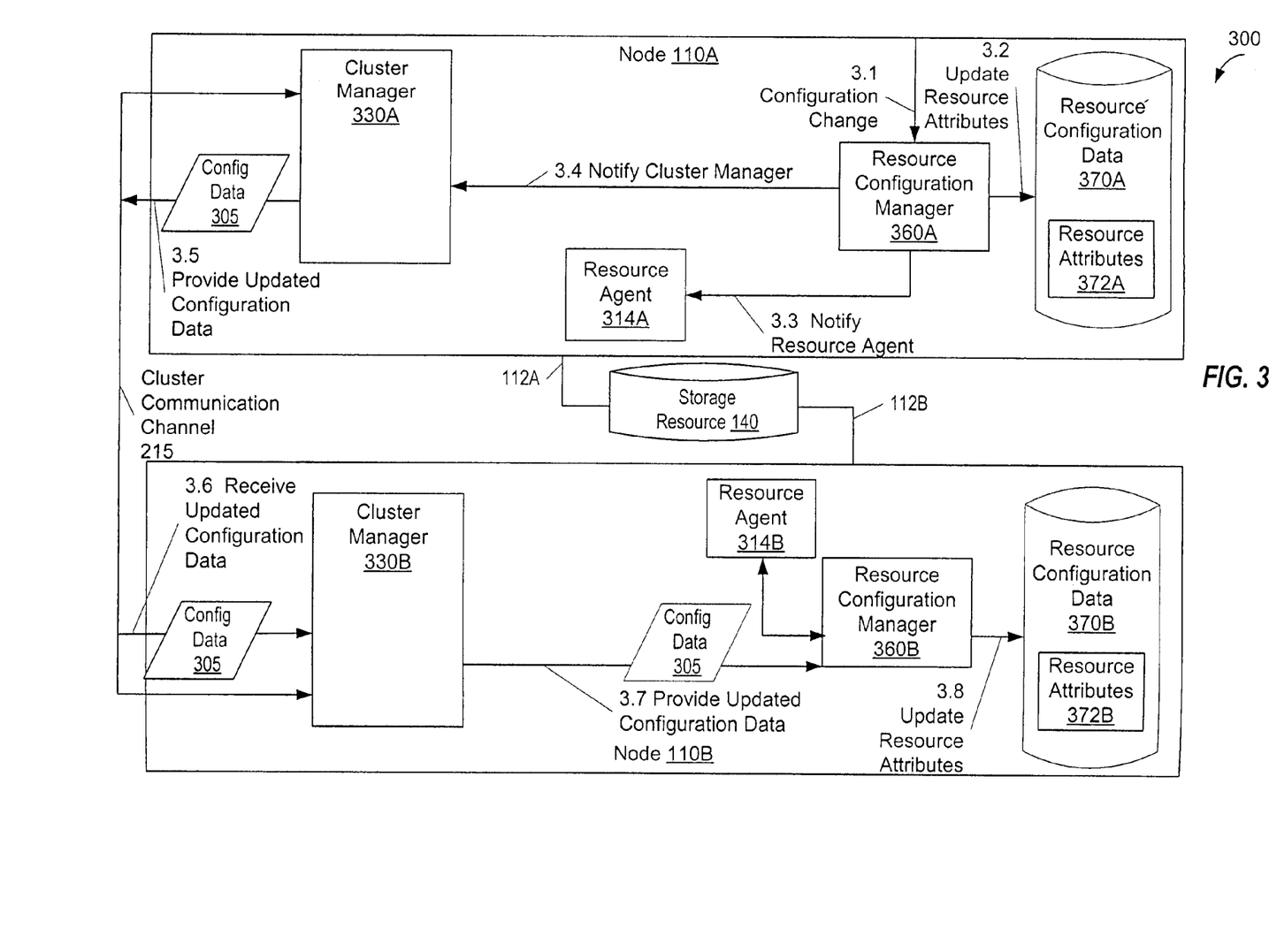
FIG. 3 is a diagram of an example of a clustering environment in which resource configurations can be changed dynamically and are communicated throughout the cluster.

FIG. 3 is a diagram of a clustering environment in which storage configuration changes can be made dynamically and are communicated throughout the cluster. Nodes 110A and 110B form a cluster 300, share storage resource 140, and communicate via cluster communication channel 215. Cluster communication channel 215 corresponds to the private network described above and is used for communication of information necessary to maintain operation of the cluster. Cluster managers 330A and 330B communicate via cluster communication channel 215 to coordinate operation of the cluster. In one embodiment, a commercially available cluster manager, VERITAS® Cluster Server™, performs the functions described herein as operations of cluster managers 330A and 330B. The invention is not limited to an implementation using VERITAS® Cluster Server™ or to a commercially available cluster manager, and the functionality of the cluster manager may be implemented as one or more modules.

Nodes 110A and 110B share resource configuration data, and each node has a respective copy, respectively labeled resource configuration data 370A and resource configuration data 370B. Each of resource configuration data 370A and 370B includes respective resource attributes 372A and 372B. Resource configuration data 370A and 370B, including resource attributes 372A and 372B, are maintained as synchronized copies using cluster communication channel 215. Resource agents 314A and 314B are present on both nodes 110A and 110B, but only one of resource agents 314A and 314B actively manages a given resource online. Other resource agents for that given resource consider the resource to be offline on their respective nodes.

Resource configuration manager 360A on node 110A and resource configuration manager 360B on node 110B are software interfaces through which resource configuration data can be changed dynamically. Typically these changes are made by an administrator using an application programming interface, a command line interface or a graphical user interface.

Maintaining resource configuration data 370A and 370B as synchronized copies is shown in the data flow of FIG. 3. In action 3.1, a resource configuration is changed via resource configuration manager 360A. In action 3.2, resource configuration manager 360A updates resource attributes 372A of resource configuration data 370A. In action 3.3, resource configuration manager 360A notifies resource agent 314A for the affected resource. Resource configuration manager 360A notifies cluster manager 330A in action 3.4. Cluster manager 330A reads resource configuration data 370A and provides configuration data 305 to all nodes in the cluster in action 3.5 via cluster communication channel 215. Configuration data 305 may include all or a portion of resource configuration data 370A.

In action 3.6, cluster manager 330B receives configuration data 305 indicating that resource attributes 372A are changed. In action 3.7, cluster manager 330B provides configuration data 305 to resource configuration manager 360B. In action 3.8, resource configuration manager 360B updates resource attributes 372B using configuration data 305 to reflect the changes made to resource attributes 372A. Resource configuration data 370A and 370B are now synchronized.

In the embodiment shown in FIG. 3, the configuration change is shared by setting attributes. For example, resource agent 314B is responsible for configuring a newly added resource or configuring resources upon startup of node 110B. When a node fails and node 110B resumes operations previously performed on the failed node, resource agent 314B reads the values of resource attributes 372B. If the values of resource attributes 372B indicate that a storage configuration change has occurred, resource agent 314B creates a new storage resource definition (not shown) on node 110B. This new resource definition reflects the configuration change written to resource attributes 372B and is used to manage the resource. Failure of a node and resumption of operation on another node is discussed further with reference to FIG. 6 below.

Figure 4:
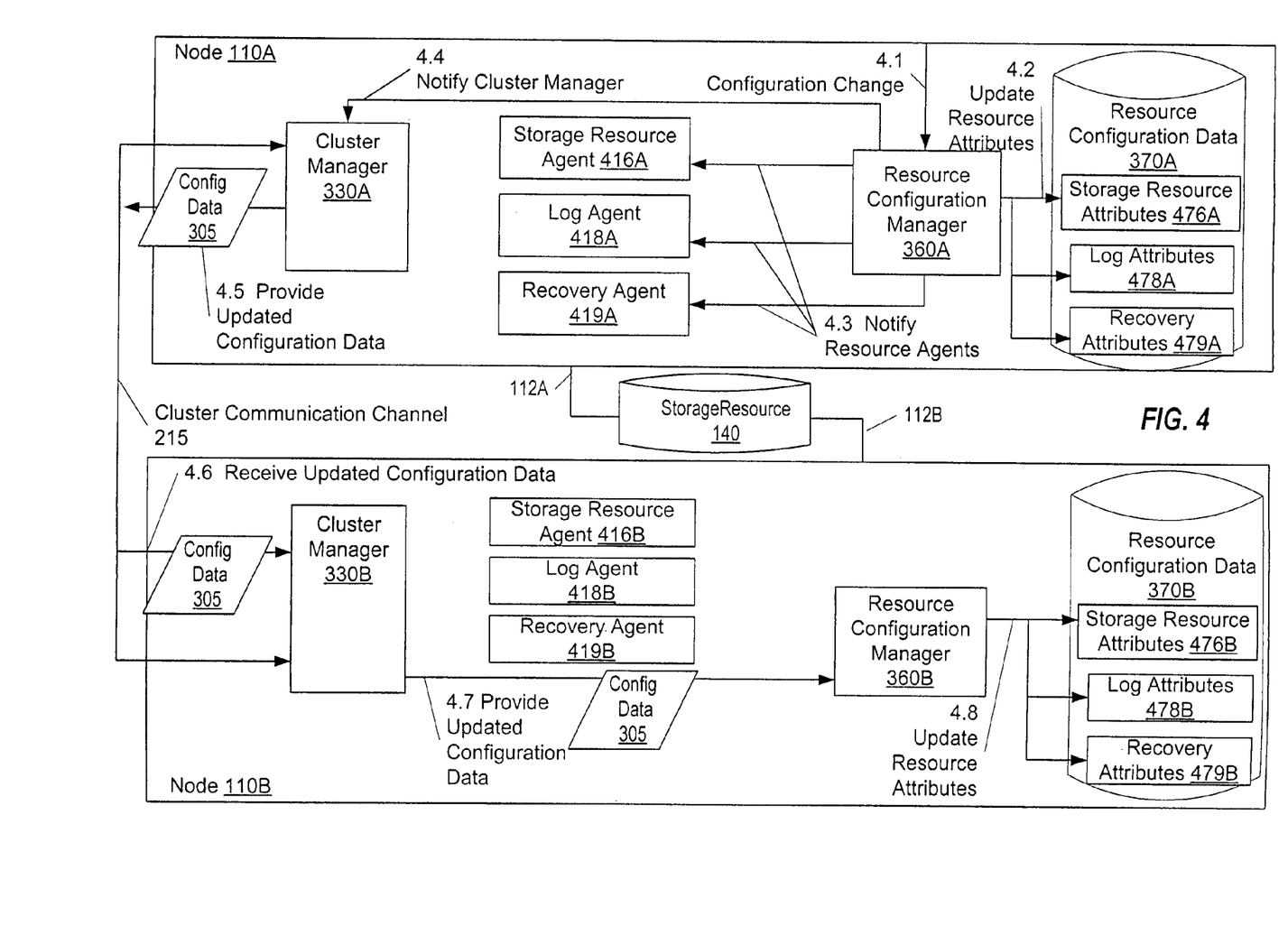
FIG. 4 is a diagram of the clustering environment of FIG. 3 including agents that operate in accordance with the present invention.

FIG. 4 is a diagram of the clustering environment of FIG. 3 including agents that operate in accordance with the present invention. On node 110A, each of storage resource agent 416A, log agent 418A, and recovery agent 419A is a resource agent. Each agent maintains respective attributes in resource configuration data 370A, including storage resource attributes 476A, log attributes 478A, and recovery attributes 479A. Node 110B similarly includes storage resource agent 416B, log agent 418B, and recovery agent 419B and corresponding storage resource attributes 476B, log attributes 478B, and recovery attributes 479B.

Log agents 418A and 418B can obtain information from a log (not shown) of activity performed on a node. Recovery agents 419A and 419B are used to recover operation of a node for which activity is recorded in the log. In one embodiment, respective recovery agents 419A and 419B also read respective attributes for log agents 418A and 418B. Operation of log agents and recovery agents is discussed further with respect to FIG. 6.

A data flow showing a configuration change is shown in FIG. 4. In action 4.1, a resource configuration is changed via resource configuration manager 360A. In action 4.2, resource configuration manager 360A updates storage resource attributes 476A, log attributes 478A, and recovery attributes 479A of resource configuration data 370A. In action 4.3, resource configuration manager 360A notifies resource agents for the affected resource, including storage resource agent 416A, log agent 418A, and recovery agent 419A. Resource configuration manager 360A also notifies cluster manager 330A in action 4.4. In action 4.5, cluster manager 330A reads resource configuration data 370A and provides configuration data 305 to all nodes in the cluster via cluster communication channel 215.

In action 4.6, cluster manager 330B receives configuration data 305, indicating that storage resource attributes 476A, log attributes 478A, and recovery attributes 479A of resource configuration data 370A are changed. In action 4.7, cluster manager 330B provides configuration data 305 to resource configuration manager 360B. In action 4.8, resource configuration manager 360B updates storage resource attributes 476B, log attributes 478B, and recovery attributes 479B of resource configuration data 370B to reflect the changes made to storage resource attributes 476A, log attributes 478A, and recovery attributes 479A of resource configuration data 370A. Resource configuration data 370A and 370B are now synchronized.

A change in an attribute is therefore made available to other nodes in the cluster via cluster communication channel 215. One of skill in the art will recognize that other mechanisms may be used to make information about a configuration change available to all nodes in the cluster. More detail about synchronization of configuration data is provided in the discussion of FIG. 5 below.

Figure 5:
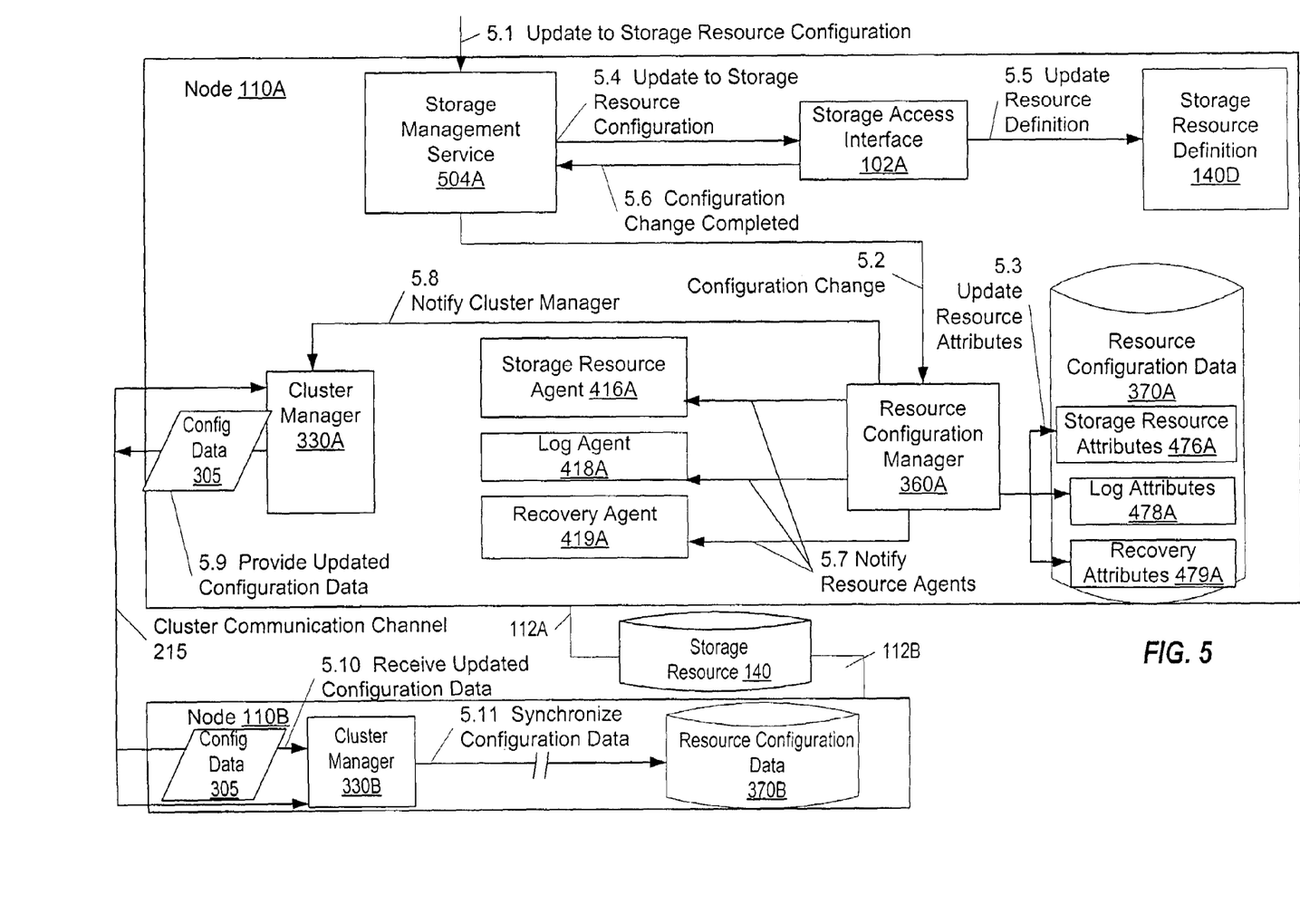
FIG. 5 shows synchronization of resource configuration data between nodes in a cluster.

FIG. 5 shows synchronization of resource configuration data between nodes in a cluster in accordance with the present invention. FIG. 5 includes a storage management service 504A, such as the storage management service shown in FIG. 1, operating in the context of the present invention. As was shown in FIG. 1, in action 5.1, an update to a storage resource configuration is provided to storage management service 504A. To coordinate with the present invention, storage management service 504A then provides the configuration change information to resource configuration manager 360A in action 5.2. In action 5.3, resource configuration manager 360A updates storage resource attributes 476A, log attributes 478A, and recovery attributes 479A of resource configuration data 370A.

In action 5.4, the update to the storage resource configuration is provided to storage access interface 102A, which updates storage resource definition 140D for storage resource 140 in action 5.5. In action 5.6, storage access interface 102A notifies storage management service 504A that the configuration update is complete. Actions 5.4 through 5.6 may occur concurrently with actions 5.2 and 5.3, and the ordering of the two sets of actions is not significant, as long as updates to both storage resource definition 140D and resource configuration data 370A occur.

After updating storage resource attributes 476A, log attributes 478A, and recovery attributes 479A of resource configuration data 370A, in action 5.7, resource configuration manager 360A notifies resource agents for the affected resource. In this embodiment, these agents include storage resource agent 416A, log agent 418A, and recovery agent 419A. In action 5.8, resource configuration manager 360A informs cluster manager 330A of the attribute changes.

In action 5.9, cluster manager 330A provides updated configuration data 305 to other nodes in the cluster. In action 5.10, cluster manager 330B of node 110B receives configuration data 305. In action 5.11, cluster manager 330B synchronizes resource configuration data 370B with resource configuration data 370A. Action 5.11 is shown as a broken arrow, indicating that intermediate steps may take place in performing the synchronization. For example, synchronization of resource configuration data 370A and resource configuration data 370B was described in more detail with respect to actions 4.7 and 4.8 of FIG. 4.

Respective cluster managers on each node, in this case cluster managers 330A and 330B, and respective resource configuration managers on each node, in this case, resource configuration managers 360A and 360B, work together to accomplish the synchronization of configuration data on a set of nodes in the cluster. The cluster manager and resource configuration manager on a given node can collectively be referred to as a synchronization module. The synchronization module can be considered to include a causing module to cause modification of a value of an attribute of a resource definition and a sending module to send the value of the attribute as the resource configuration data to the set of nodes.

Similarly, because the cluster manager and the resource configuration manager work together to resume operation of a resource on a secondary node, the cluster manager and resource configuration manager collectively can be referred to as a resuming module. In the example shown, the synchronization and the resuming modules both include the cluster manager and the resource configuration manager; however, it is not necessary that the modules are implemented using the same components. A different configuration of modules may be implemented to provide the synchronizing and resumption of operation of resources functionality described herein.

Because a resource agent working with the resource configuration manager can create a resource definition for the resource from the configuration data on one of the nodes, each node may be considered to include a creating module. The node on which the resource definition is created uses the resource definition for managing the resource.

Figure 6:
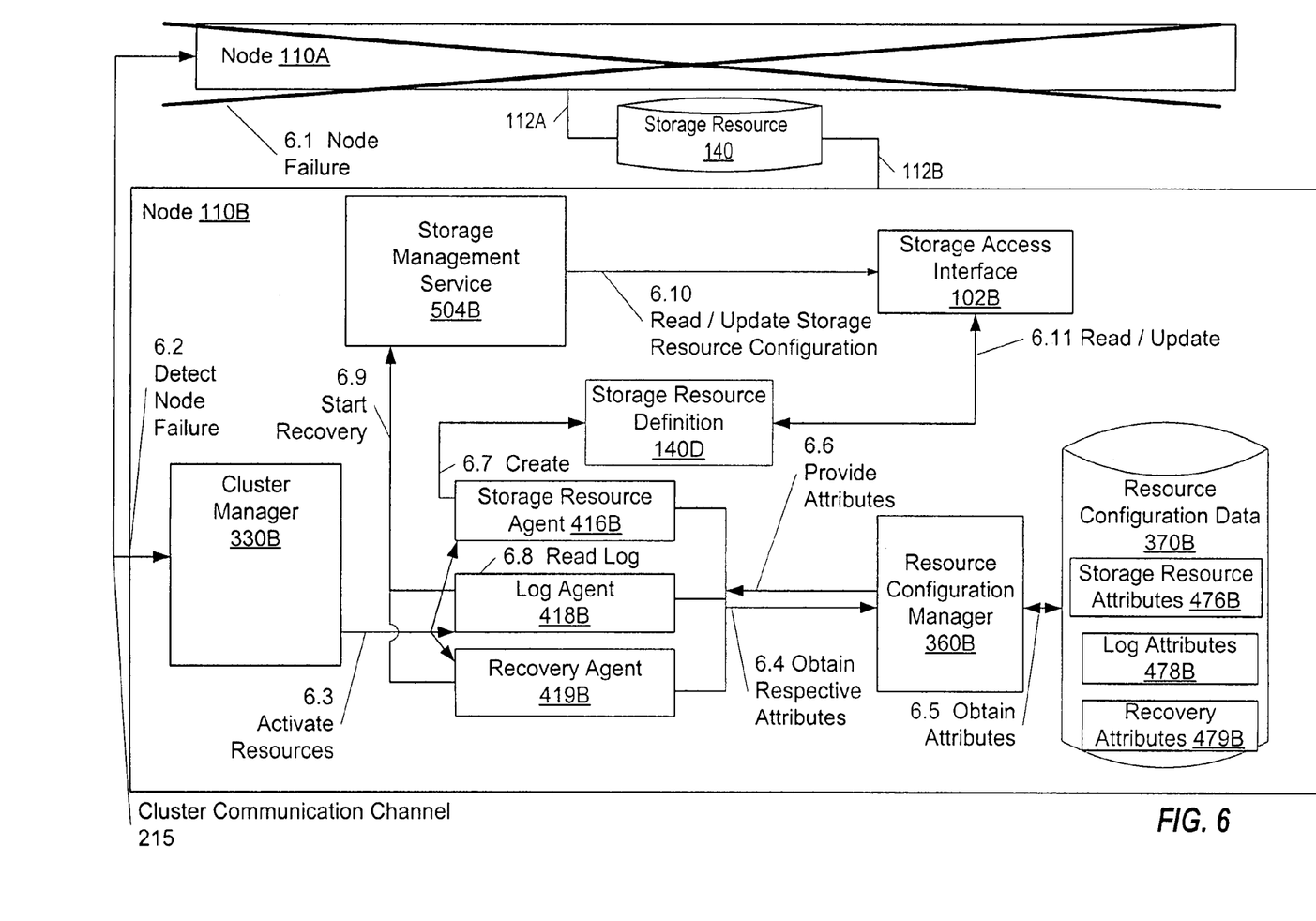
FIG. 6 is a diagram illustrating actions taken by the agents of FIGS. 4 and 5 upon failure of the primary node in the cluster to resume operation of a resource previously managed by the failed node.

FIG. 6 is a diagram illustrating actions taken by the agents of FIGS. 4 and 5 upon failure of the primary node 110A in the cluster. In action 6.1, node 110A fails. In action 6.2, cluster manager 330B detects the failure of node 110A via cluster communication channel 215. Cluster manager 330B monitors heartbeats of other nodes in the cluster via communication channel 215, detects that node 110A is no longer accessible, and initiates failover.

In response to the failover, in action 6.3, cluster manager 330B activates resources. In one embodiment, cluster manager 330B calls an "online" entry point, or set of instructions, for each agent. Also in action 6.3, storage resource agent 416A, log agent 418B, and recovery agent 419B begin preparation to actively manage resources, such as storage resource 140. In action 6.4, each of storage resource agent 416A, log agent 418B, and recovery agent 419B requests resource configuration manager 360B for respective attributes. Resource configuration manager 360B obtains the attributes from storage resource attributes 476B, log attributes 478B, and recovery attributes 479B of resource configuration data 370B in action 6.5. Because resource configuration data 370A and 370B are synchronized, cluster manager 330B has access to current values for the attributes for storage resource 140.

In action 6.6, resource configuration manager 360B provides storage resource attributes 476B, log attributes 478B, and recovery attributes 479B to the respective agents storage resource agent 416A, log agent 418B, and recovery agent 419B. In action 6.7, storage resource agent 416B uses storage resource attributes 476B to create storage group definition 140D on node 110B.

Using a log disk name obtained from log attributes 478B, log agent 418B reads a log (not shown) of activity in action 6.8. From the log, log agent 418B obtains information about the operation that was in progress during failure and any storage resources that were involved in the operation.

In action 6.9, recovery agent 419B starts recovery of operations using data obtained from the log. In action 6.10, storage management service 504B informs storage access interface 102B that an update to a storage resource configuration is being made. In action 6.11, storage access interface 102B reads and/or updates storage group definition 140D.

As configuration information is made available to nodes in a cluster, an additional problem arises. For example, assume that an administrator manually switches the node managing a given resource. In such a case, a resource definition can reside on each of the two nodes, the original managing node and the new managing node. Using these resource definitions, it is possible that agents on both nodes may declare the resource online. If both resource agents declare the resource online, a concurrency violation has occurred because a given resource can be online on only one node in the cluster.

To avoid this problem, an attribute such as one of storage resource attributes 476B can be used. The attribute can be updated with the name of the host that manages the resource. Every agent can compare the name of the host on which the agent is running with the name of the host in the attribute before declaring a resource to be online on the host on which the agent is running.

Assume that several disks are configured to serve as log disks, and that the active log disk name changes depending upon which of the disks is currently being used. An attribute can be used to store the name of the currently active log disk. When a configuration change is being made, the attribute containing the name of the currently active log disk is updated. When an operation completes successfully, the name of the log disk can be removed from this attribute. A non-null value for the log disk attribute during failover indicates that an operation failed and provides the name of the log disk for recovery purposes.

Advantages of the present invention are many. A set of nodes, and preferably any node, in a cluster can resume operations of a failed node. These operations include storage management services that allow configuration changes to be made dynamically to storage resources. Little overhead is incurred to communicate configuration changes to the nodes in a cluster.

The following section describes an example computer system and network environment in which the present invention may be implemented.

An Example Computing and Network Environment

Figure 7:
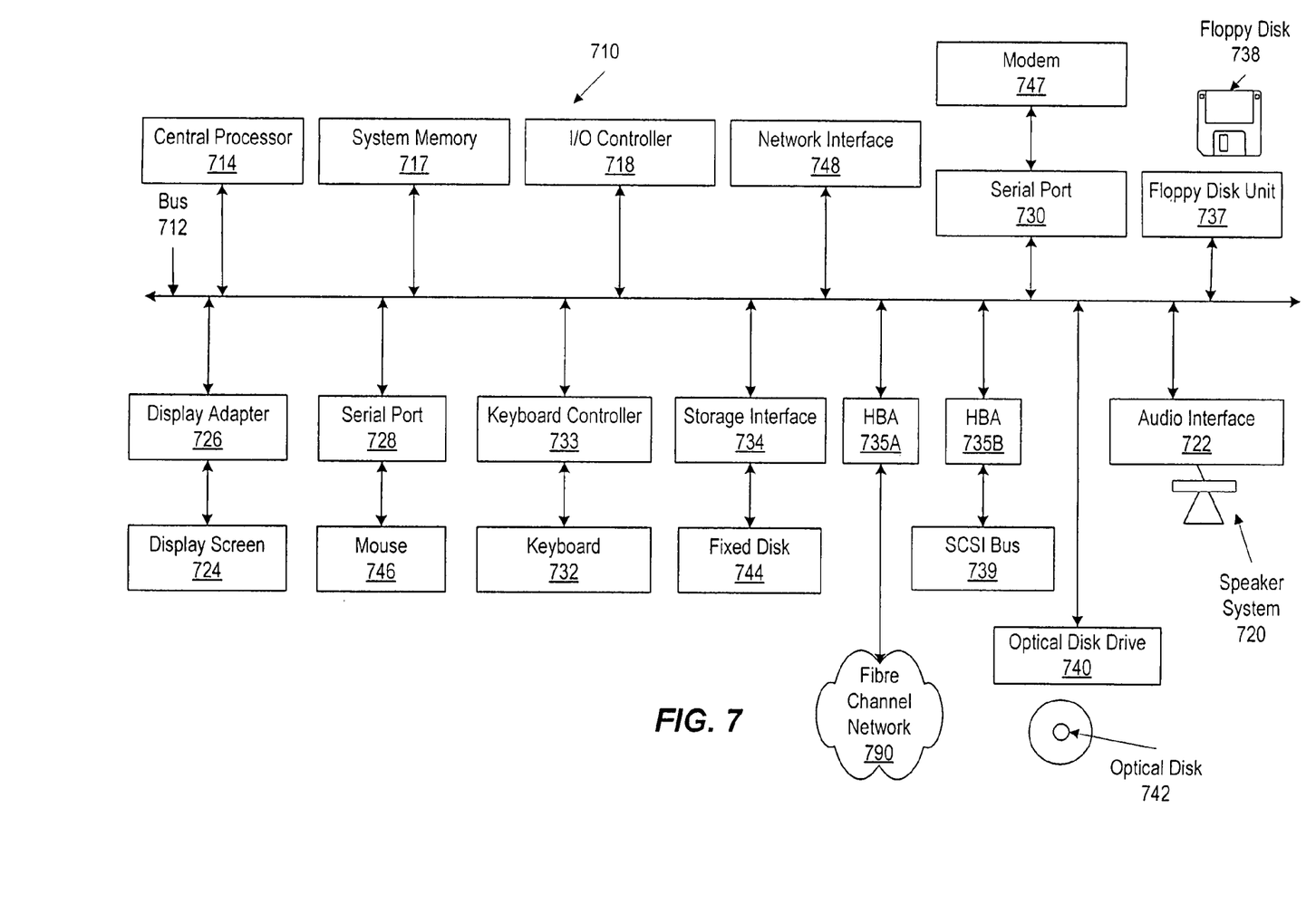
FIG. 7 is a block diagram illustrating a computer system suitable for implementing embodiments of the present invention.

FIG. 7 depicts a block diagram of a computer system 710 suitable for implementing the present invention. Computer system 710 includes a bus 712 which interconnects major subsystems of computer system 710, such as a central processor 714, a system memory 717 (typically RAM, but which may also include ROM, flash RAM, or the like), an input/output controller 718, an external audio device, such as a speaker system 720 via an audio output interface 722, an external device, such as a display screen 724 via display adapter 726, serial ports 728 and 730, a keyboard 732 (interfaced with a keyboard controller 733), a storage interface 734, a floppy disk drive 737 operative to receive a floppy disk 738, a host bus adapter (HBA) interface card 735A operative to connect with a fibre channel network 790, a host bus adapter (HBA) interface card 735B operative to connect to a SCSI bus 739, and an optical disk drive 740 operative to receive an optical disk 742. Also included are a mouse 746 (or other point-and-click device, coupled to bus 712 via serial port 728), a modem 747 (coupled to bus 712 via serial port 730), and a network interface 748 (coupled directly to bus 712).

Bus 712 allows data communication between central processor 714 and system memory 717, which may include read-only memory (ROM) or flash memory (neither shown), and random access memory (RAM) (not shown), as previously noted. The RAM is generally the main memory into which the operating system and application programs are loaded and typically affords at least 66 megabytes of memory space. The ROM or flash memory may contain, among other code, the Basic Input-Output system (BIOS) which controls basic hardware operation such as the interaction with peripheral components. Applications resident with computer system 710 are generally stored on and accessed via a computer readable medium, such as a hard disk drive (e.g., fixed disk 744), an optical drive (e.g., optical drive 740), floppy disk unit 737 or other storage medium. Additionally, applications may be in the form of electronic signals modulated in accordance with the application and data communication technology when accessed via network modem 747 or interface 748.

Storage interface 734, as with the other storage interfaces of computer system 710, may connect to a standard computer readable medium for storage and/or retrieval of information, such as a fixed disk drive 744. Fixed disk drive 744 may be a part of computer system 710 or may be separate and accessed through other interface systems. Modem 747 may provide a direct connection to a remote server via a telephone link or to the Internet via an internet service provider (ISP). Network interface 748 may provide a direct connection to a remote server via a direct network link to the Internet via a POP (point of presence). Network interface 748 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, it is not necessary for all of the devices shown in FIG. 7 to be present to practice the present invention. The devices and subsystems may be interconnected in different ways from that shown in FIG. 7. The operation of a computer system such as that shown in FIG. 7 is readily known in the art and is not discussed in detail in this application. Code to implement the present invention may be stored in computer-readable storage media such as one or more of system memory 717, fixed disk 744, optical disk 742, or floppy disk 738. Additionally, computer system 710 may be any kind of computing device, and so includes personal data assistants (PDAs), network appliance, X-window terminal or other such computing devices. The operating system provided on computer system 710 may be MS-DOS®, MS-WINDOWS®, OS/2®, UNIX®, Linux®, or another known operating system. Computer system 710 also supports a number of Internet access tools, including, for example, an HTTP-compliant web browser having a JavaScript interpreter, such as Netscape Navigator®, Microsoft Explorer®, and the like.

Moreover, regarding the signals described herein, those skilled in the art will recognize that a signal may be directly transmitted from a first block to a second block, or a signal may be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing described embodiment wherein the different components are contained within different other components (e.g., the various elements shown as components of computer system 710). It is to be understood that such depicted architectures are merely examples, and that, in fact, many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

Figure 8:
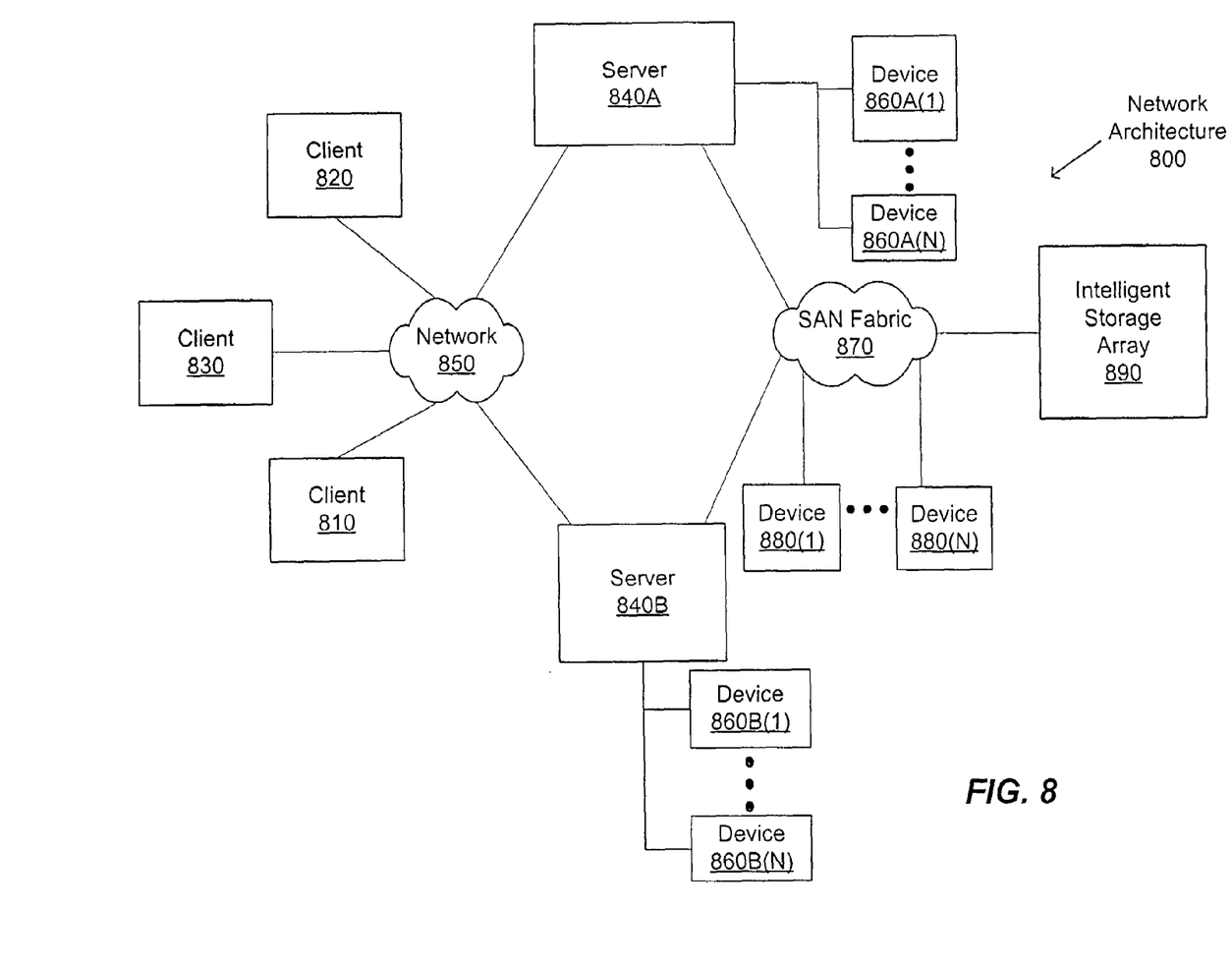
FIG. 8 is a block diagram illustrating a network environment in which storage management services according to embodiments of the present invention may be used.

FIG. 8 is a block diagram depicting a network architecture 800 in which client systems 810, 820 and 830, as well as storage servers 840A and 840B (any of which can be implemented using computer system 710), are coupled to a network 850. Storage server 840A is further depicted as having storage devices 860A(1)-(N) directly attached, and storage server 840B is depicted with storage devices 860B(1)-(N) directly attached. Storage servers 840A and 840B are also connected to a SAN fabric 870, although connection to a storage area network is not required for operation of the invention. SAN fabric 870 supports access to storage devices 880(1)-(N) by storage servers 840A and 840B, and so by client systems 810, 820 and 830 via network 850. Intelligent storage array 890 is also shown as an example of a specific storage device accessible via SAN fabric 870.

With reference to computer system 710, modem 747, network interface 748 or some other method can be used to provide connectivity from each of client computer systems 810, 820 and 830 to network 850. Client systems 810, 820 and 830 are able to access information on storage server 840A or 840B using, for example, a web browser or other client software (not shown). Such a client allows client systems 810, 820 and 830 to access data hosted by storage server 840A or 840B or one of storage devices 860A(1)-(N), 860B(1)-(N), 880(1)-(N) or intelligent storage array 890. FIG. 8 depicts the use of a network such as the Internet for exchanging data, but the present invention is not limited to the Internet or any particular network-based environment.

OTHER EMBODIMENTS

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing described embodiments include components contained within other components. It is to be understood that such architectures are merely examples, and that, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments may be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably, or remotely coupled to a microprocessor/memory system. Thus, the modules may be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention. Consequently, the invention is intended to be limited only by the scope of the appended claims, giving full cognizance to equivalents in all respects.

What is claimed is:

1. A method comprising:
   synchronizing resource configuration data for a resource, wherein
   the resource configuration data reside on a set of at least two nodes of a cluster comprising a plurality of nodes,
   the synchronizing uses a private channel,
   the nodes of the cluster are coupled to one another by the private channel, and
   the synchronizing is performed when the resource configuration data are changed; and
   resuming operation of the resource at a second node of the set of at least two nodes using the resource configuration data when a first node of the set of at least two nodes fails, wherein
   the first node managed the resource prior to failure.

2. The method of claim 1, wherein
   the set of at least two nodes of the cluster comprises all nodes in the cluster.

3. The method of claim 1, wherein
   the resource configuration data comprise a value of an attribute of a resource definition for the resource.

4. The method of claim 3, wherein the resource definition is defined in a context of a cluster manager.

5. The method of claim 1, wherein
   the synchronizing the resource configuration data comprises
   causing modification of a value of an attribute of a resource definition, and
   sending the value of the attribute as the resource configuration data to each node of the set of at least two nodes.

6. The method of claim 1, further comprising:
   creating a resource definition for the resource from the resource configuration data on one node of the set of at least two nodes, wherein
   the one node uses the resource definition for managing the resource.

7. A system comprising:
   means for synchronizing resource configuration data for a resource, wherein
   the resource configuration data reside on a set of at least two nodes of a cluster comprising a plurality of nodes,
   the means for synchronizing is configured to use a private channel,
   the nodes of the cluster are coupled to one another by the private channel, and
   the resource configuration data are synchronized when the resource configuration data are changed; and
   means for resuming operation of the resource at a second node of the set of at least two nodes using the resource configuration data when a first node of the set of at least two nodes fails, wherein
   the first node managed the resource prior to failure.

8. The system of claim 7, wherein
   the means for synchronizing the resource configuration data comprises
   means for causing modification of a value of an attribute of a resource definition, and
   means for sending the value of the attribute as the resource configuration data to each node in the set of at least two nodes.

9. The system of claim 7, further comprising:
   means for creating a resource definition for the resource from the resource configuration data on one node of the set of at least two nodes, wherein
   the one node uses the resource definition for managing the resource.

10. A computer program product comprising:
    synchronizing instructions to synchronize resource configuration data for a resource, wherein
    the resource configuration data reside on a set of at least two nodes of a cluster comprising a plurality of nodes,
    the synchronizing instructions use a Private channel,
    the nodes of the cluster are coupled to one another by the private channel, and
    the resource configuration data are synchronized when the resource configuration data are changed;
    resuming instructions to resume operation of the resource at a second node of the set of at least two nodes using the resource configuration data when a first node of the set of at least two nodes fails, wherein
    the first node managed the resource prior to failure, and
    the computer-readable medium further stores; and
    a computer-readable storage medium configured to store the synchronizing instructions and the resuming instructions.

11. The computer program product of claim 10, wherein the synchronizing instructions comprise
    causing instructions to cause modification of a value of an attribute of a resource definition, and
    sending instructions to send the value of the attribute as the resource configuration data to each node in the set of at least two nodes;
    and
    the computer-readable storage medium is further configured to store the causing instructions and the sending instructions.

12. The computer program product of claim 10, further comprising:
    creating instructions to create a resource definition for the resource from the resource configuration data on one node of the set of at least two nodes, wherein
    the one node uses the resource definition for managing the resource, and
    the computer-readable storage medium is further configured to store the causing instructions.

13. A system comprising:
    a synchronizing module to synchronize resource configuration data for a resource, wherein
    the resource configuration data reside on a set of at least two nodes of a cluster comprising a plurality of nodes,
    the synchronizing module uses a private channel,
    the nodes of the cluster are coupled to one another by the private channels and
    the resource configuration data are synchronized when the resource configuration data are changed; and
    a resuming module to resume operation of the resource at a second node of the set of at least two nodes using the resource configuration data when a first node of the set of at least two nodes fails, wherein
    the first node managed the resource prior to failure.

14. The system of claim 13 wherein
the synchronizing module comprises
   a causing module to cause modification of a value of an attribute of a resource definition, and
   a sending module to send the value of the attribute as the resource configuration data to each node in the set of at least two nodes.

15. The system of claim 13 further comprising:
   a creating module to create a resource definition for the resource from the resource configuration data on one node of the set of at least two nodes, wherein
   the one node uses the resource definition for managing the resource.

\* \* \* \* \*